G. W. WELLS.
EYEGLASS SPRING.
APPLICATION FILED FEB. 24, 1908.
922,227.
Patented May 18, 1909.
2 SHEETS—SHEET 1.
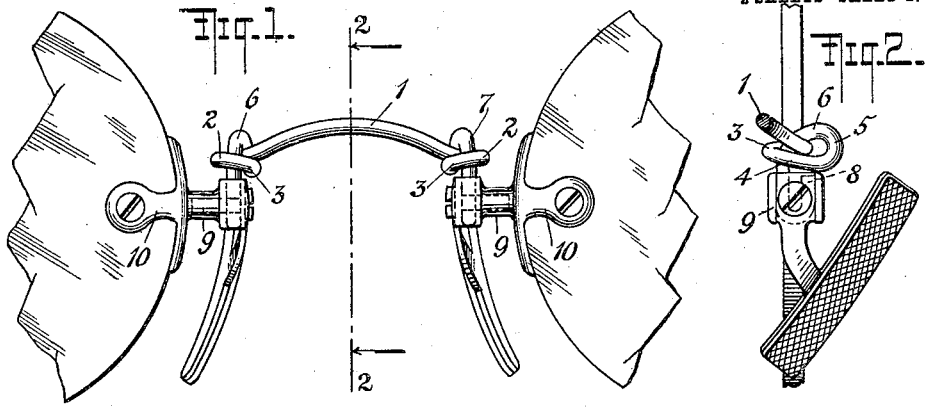
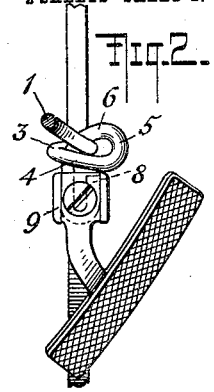
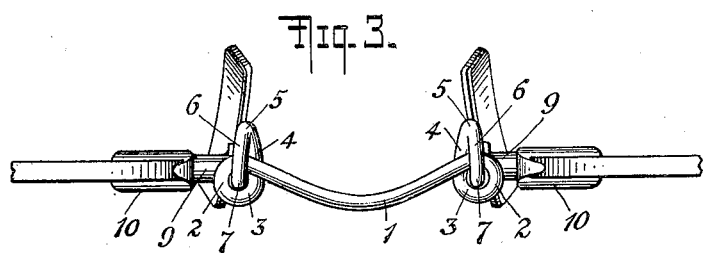
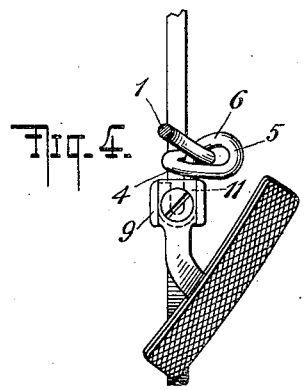
WITNESSES:
INVENTOR
GEORGE W. WELLS
BY
ATTORNEYS

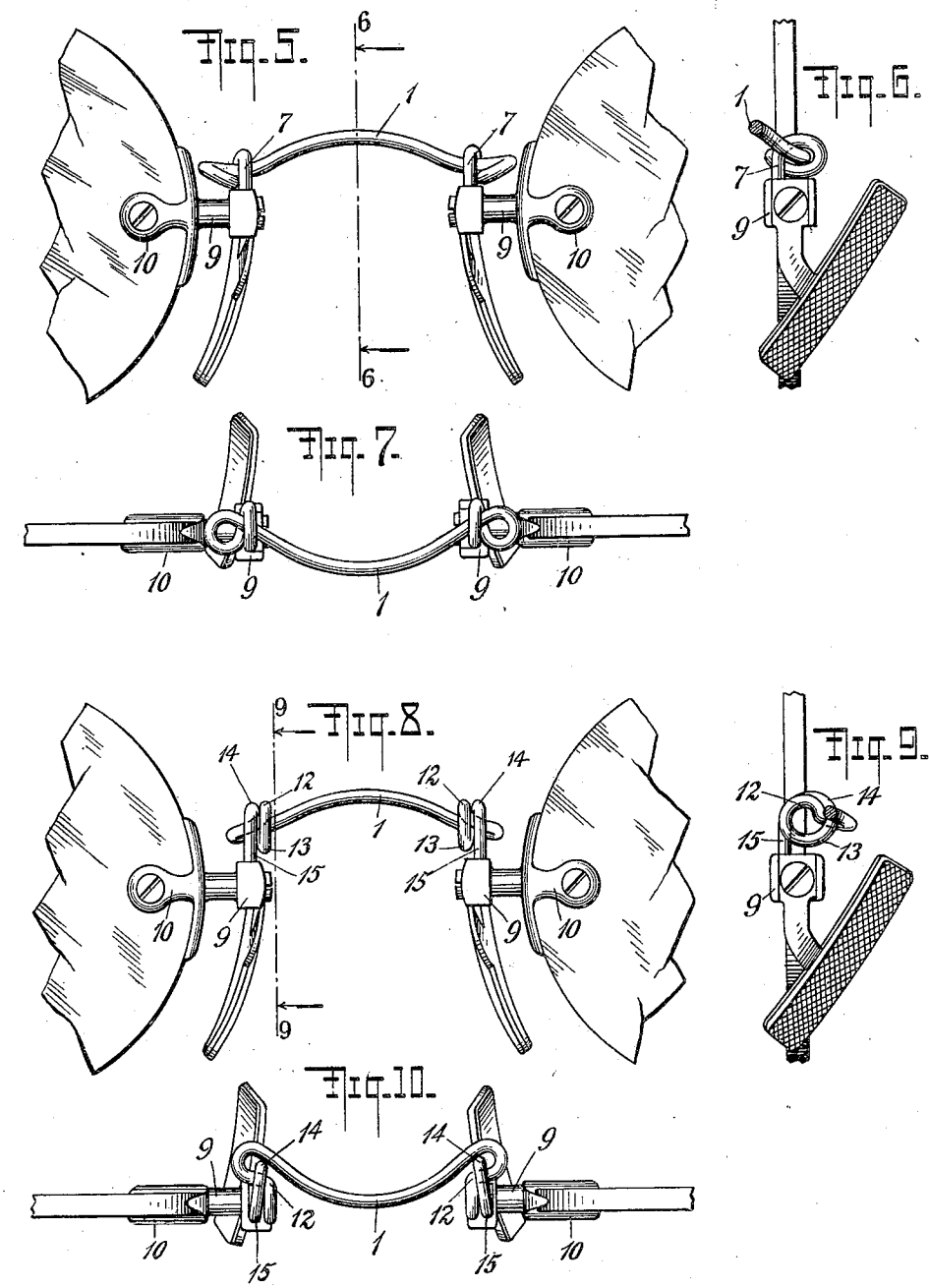

UNITED STATES PATENT OFFICE.

GEORGE W. WELLS, OF SOUTHBRIDGE, MASSACHUSETTS.

EYEGLASS-SPRING.

No. 922,227.  Specification of Letters Patent.  Patented May 18, 1909.

Application filed February 24, 1908. Serial No. 417,225.

*To all whom it may concern:*

Be it known that I, GEORGE W. WELLS, a citizen of the United States, and resident of Southbridge, in the county of Worcester and State of Massachusetts, have invented a new and useful Improvement in Eyeglass-Springs, of which the following is a description.

My invention relates to that general type of eyeglass springs in which a single spring is bent to form a nose bridge, and a plurality of bends at each end of the nose bridge so as to confine as much as possible of the bending to those end bends and remove as much of the bending as possible from the nose bridge itself.

My invention relates further to nose bridges in which these end bends are locked against permanent deformation, a broad type described in my prior application #397,281, filed October 14th, 1907.

The object of my invention is especially to produce an eyeglass spring of this character, in which the bends are maintained in an exceedingly small space, without in any degree detracting from the extent of said bends, and at the same time providing means whereby these bends are perfectly locked against permanent deformation.

In the accompanying drawings Figure 1 is a front elevation of a pair of glasses equipped with this eyeglass spring, the lenses themselves being shown in fragmentary form; Fig. 2 is a vertical section through the center of the nose bridge of said glasses on line 2—2 of Fig. 1; Fig. 3 is a plan view of the same; Fig. 4 is a vertical cross section, similar to that in Fig. 2, but showing a slightly different mode of attachment of the end bends to the lens-clamp post; Fig. 5 is a front elevation of still another modification; Fig. 6 is a vertical section of the modification shown in Fig. 5 on line 6—6; Fig. 7 is a plan view of the same; Fig. 8 is a front elevation of still another modification. Fig. 9 is a vertical section of the modification in Fig. 8; and Fig. 10 is a plan view of the same.

In Figs. 1, 2, and 3, the eyeglass spring comprises the nose bridge 1, which is extended on both sides to form a plurality of bends. The first of these bends is a forward bend 2; the eyeglass spring is then bent inwardly to form the inward bend 3; then rearwardly to form the rearward bend 4, upwardly to form the upward bend 5, forwardly to form the forward bend 6, and downwardly forming the downward bend 7. The eyeglass spring is finally bent into a rearwardly directed U-shaped attaching end 8, which is attached to the post 9 on the lens-clamp 10. The result of these various bends is such that a composite horizontal circular bend is formed from the bends 2, 3, and 4, and a composite vertical circular bend from the bends 4, 5, and 6, the end of this circular bend which is finally bent downward to form the downward bend 7, being passed through the center of the horizontal circular bend.

The modification shown in Fig. 4 is the same as that in previous figures, except that the U-shaped attaching end 11 extends forwardly, instead of rearwardly.

In Figs. 5, 6, and 7, the arrangement of the bends at the ends of the nose bridge is exactly the same as that already described with regard to the preceding figures, except that the downward bend 7 does not pass through the center of the horizontal circular bend, but is extended around the nose bridge on the side of the horizontal circular bend farthest away from the eyeglass and is then attached directly to the post 9.

In the modification shown in Figs. 8, 9 and 10, the construction is somewhat different from the modifications already described, though certain generic features present in the preceding modifications are also present in the modification shown in these figures, that is to say, in these figures there is a forward bend, 12, a rearward bend, 13, an upward bend, 14, and a downward bend, 15, the bend 15 being extended and bent into a U-shaped attaching end (not shown). Further, it will be seen that the bends 13 and 14 are so shaped as to produce a circular formation, and that this passes around the forward bend, 12, thus locking the latter from displacement. It will be noted that a construction of this kind is such that the portions of the eyeglass spring which are adapted to bend to adjust the nose-guards to the nose of the patient, are contained in an exceedingly compact space, notwithstanding the considerable length of the spring material included. The end bends are furthermore so arranged as to render it practically impossible by an ordinary use of the glasses to deflect them permanently from their normal positions, as the various elements of these end bends are so arranged as to be interlocked with each other. At the same time there is quite a considerable amount of free play permissible in the bending operation to adjust the glasses to the nose of the patient, as I have preferably constructed these end bends so that the various elements thereof are maintained out of contact with each other, still such an arrangement is not absolutely necessary, as in certain instances some of the elements of the bends might be allowed to contact with each other, without detracting from the efficient bending of these parts. Glasses of this character are such that they are especially adapted for bending in a horizontal plane, in contradistinction to a vertical plane for the purpose of adjusting them to the nose of the patient. This is especially valuable in glasses containing corrections for astigmatism, for, as will be readily recognized, any rotary deflection of the glasses in a vertical plane would result in a displacement of the axes of the cylindrical elements in the lenses, and consequently they would no longer be accurate corrections for defects in vision due to astigmatism.

In the modifications shown in Figs. 1 to 7, the bends are particularly arranged in such a way that there is more freedom for bending in a horizontal plane than in a vertical plane. This can readily be seen, as any movement in a vertical plane would only result, in the modifications, in bringing the downward bend 7 in contact with some other portion of the eyeglass spring, whereas any movement in a horizontal plane is not obstructed in this way, but can readily be accomplished by a torsional movement of the bend 6. It will be seen that the bends located at each end of the bridge form a loose knot at each end of the bridge, and that in each of the constructions shown, one of the bends extends around the bridge.

While I have described the construction of the eyeglasses which embody my invention, I do not wish it to be understood that I am thereby limited to the details disclosed in these constructions, but consider that my invention is largely a broad one, as will be brought out in the appended claims.

What I claim and desire to cover by Letters Patent is:

1. A spring bridge for eyeglasses, having a plurality of bends at each end, such bends forming a loose knot at each end of the bridge.

2. In an eyeglass, a lens, a post connected with said lens, and a spring bridge attached to said post, said bridge terminating in a series of bends, one of which extends around said bridge.

3. A spring nose-bridge for eyeglasses, having at each end thereof a circular bend and an additional vertical circular bend extending around the nose-bridge.

4. A spring nose-bridge for eyeglasses having at each end thereof a horizontal circular bend, and a vertical circular bend extending around the nose-bridge.

5. A spring nose-bridge for eyeglasses having at each end thereof a horizontal circular bend, and a vertical circular bend, the end of which extends through the horizontal circular bend.

6. In eyeglasses, the combination of posts and a nose-bridge having at each end thereof a horizontal circular bend, and a vertical circular bend, the end of which extends through the horizontal circular bend, and is attached to one of the posts.

In testimony whereof I have signed my name in the presence of two subscribing witnesses, this 15th day of February 1908.

GEORGE W. WELLS.

Witnesses:
 CHANNING M. WELLS,
 IRENE K. WELLS.